Feb. 19, 1935.　　　　J. R. COOLIDGE　　　　1,992,057
TELEPHONE POLE AND PROCESS OF PREPARING SAME
Filed Nov. 7, 1931
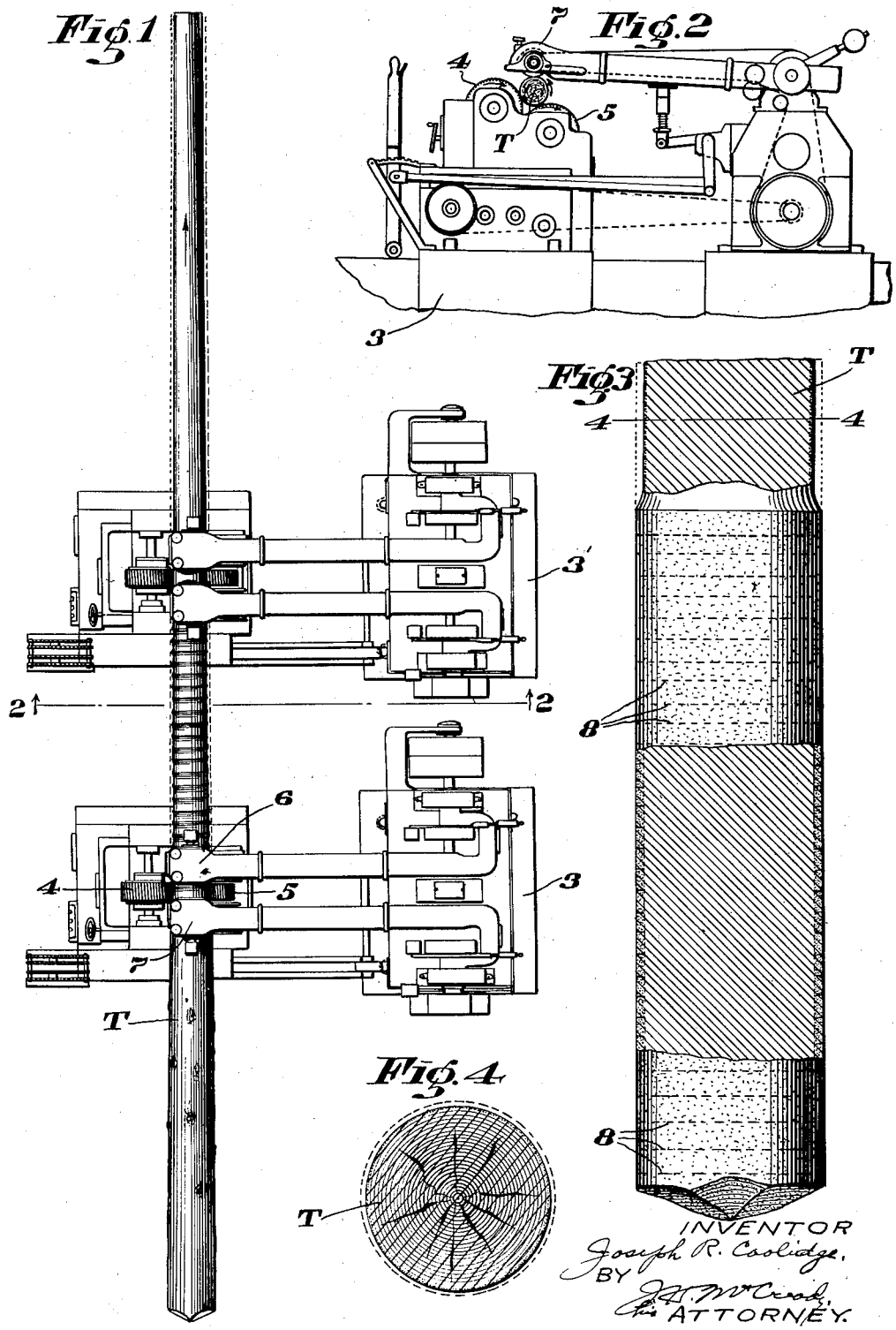
INVENTOR
Joseph R. Coolidge,
BY
ATTORNEY.

Patented Feb. 19, 1935

1,992,057

UNITED STATES PATENT OFFICE 1,992,057

TELEPHONE POLE AND PROCESS OF PREPARING SAME

Joseph R. Coolidge, Brookline, Mass.

Application November 7, 1931, Serial No. 573,605

3 Claims. (Cl. 99—12)

This invention relates to wooden poles such as those used for supporting telegraph, telephone, electric light and power wires.

At the present time such poles usually consist either of southern pine or cedar. The characteristics of these two species are quite different and the decision as to which shall be used depends upon a number of practical considerations, such as cost at the locality where the poles are to be used, requirements of the location, the character of the load to be imposed on the pole, and other factors of a very practical nature. The superior strength of southern pine as compared to cedar gives this species a very important advantage. On the other hand, the high resistance to decay which is a natural characteristic of the heartwood of cedar is an extremely valuable property. This advantage, however, is largely offset by the practice of impregnating southern pine poles, for their entire length if desired, with some preservative such as creosote oil, Montan wax, mixtures of these materials, and various other well known preserving agents. Such treatments give southern pine poles a high degree of resistance to decay, and this fact, combined with the greater mechanical strength of these poles, can only be equalled in the cedar pole by substantially increasing its size as compared with that of the hard pine pole.

A further disadvantage of a cedar pole is the fact that the sapwood has totally different characteristics from the heartwood. While the latter is a very satisfactory wood for poles, the sapwood is extremely susceptible to decay, and when exposed to the weather it becomes punky and very weak mechanically in a relatively short time. Due to this fact the sapwood offers an insecure and unreliable hold for the spikes of a lineman's climbing irons. In order to protect the sapwood it is a very common practice to impregnate the butt portion of a cedar pole with a creosote oil or some other preservative and simply to stain or coat the part of the pole exposed above ground with some coating substance in which creosote oil predominates. This butt treatment is almost, if not entirely, given by the open tank method. Inasmuch as cedar is extremely resistant to radial penetration of treating liquids, it is the usual practice to incise or perforate the butt portion of the pole which is to be impregnated in order to provide for the free entrance of the impregnating medium through the sapwood to the desired depth and at intervals sufficiently frequent to permit longitudinal travel of the preservative lengthwise of the grain substantially throughout the sapwood. The stain or paint which is customarily applied to the part of the pole above the butt is effective only for a relatively short time and it only partly cures the objections to the sapwood in this part of the pole. However, the difficulties in producing the desired degree of penetration in cedar are such that it has not been considered practical to impregnate cedar poles for their entire lengths in order to protect the sapwood above ground. While this could be done by incising or perforating the entire length of the pole and then impregnating it, such a process would greatly increase the expense of preparing the pole for erection, both because of the operations required and also due to the cost of the impregnating material that would be absorbed by the pole. This increase in expense would place the cedar pole so treated at an even greater disadvantage in competing with hard pine poles than is the case under the present practice.

The present invention deals especially with these conditions. It aims so to improve cedar poles and the methods of treating them as to overcome many of the objections to them, to reduce the expense of preparing a cedar pole for erection, and to provide a pole of this species which can compete more effectively with poles of other species.

The nature of the invention will be readily understood from the following description when read in connection with the accompanying drawing, and the novel features will be particularly pointed out in the appended claims.

In the drawing,

Figure 1 is a plan view illustrating certain steps in the preferred method of preparing a pole according to this invention;

Fig. 2 is an end view of one of the machine units illustrated in Fig. 1 showing it in operation on a pole;

Fig. 3 is a view, partly in section and partly in side elevation, of the lower part of a pole prepared in accordance with this invention; and Fig. 4 is a sectional view on the line 4—4, Fig. 3.

According to the preferred process a cedar pole just as it comes from the woods, or after being seasoned, is first shaved for its entire length above the butt to a depth sufficient to remove substantially all of the sapwood. Usually the sapwood either in eastern or western cedar poles is not more than one-half an inch or three-quarters of an inch in thickness and this layer of wood may be taken off either by hand shaving with draw shaves, or, more preferably, with machinery of some suitable form. While it has been almost, if not quite, the universal practice heretofore to shave poles by hand, such shaving has been performed chiefly for the purpose of removing a very thin layer of the outer wood, or really the inner bark of the tree. Nevertheless machines such as those used, for example, in turning masts, flag poles, and the like, are available for removing a considerably greater depth of wood from a pole. One such machine is illustrated at 3 in Figs. 1 and 2. It comprises toothed rolls 4 and 5 for supporting and rotating the pole T, the rolls serving also to feed the pole longitudinally while they revolve it about approximately its own axis. One or more rotary cutters are arranged to operate on the pole while it is revolved in this manner. In the particular arrangement shown two cutters are employed carried, respectively, by the cutter heads 6 and 7. As these cutters act on the pole they are guided by suitable gages which, in combination with the rate of feed of the pole, determine the depth of cut. Since these machines are known, no detailed description of them is necessary.

The exact arrangement of machinery which will be used necessarily will depend upon the requirements of individual producers. It may, for example, be desirable to use two of these machines, as shown in Fig. 1, the second machine 3' being like the machine 3 except for differences in the cutters. The pole is fed through the machines in the direction indicated by the arrow in Fig. 1, and the cutters of the first machine 3 may be designed to take off the greater part of the sapwood and to make "roughing" cuts, while those of the second machine 3' smooth up the work begun by the first cutters and produce a relatively smooth finished surface. For some purposes both of these operations can be satisfactorily performed in the first machine 3, the roughing cut being made by the cutter of the cutter head 7, while the finishing cut is made by the cutter of the head 6. Where it is desirable to use two machines they may be arranged to operate successively but not simultaneously on each pole.

This operation removes substantially all of the sapwood from the portion of the pole above the lower six, seven or eight feet which is commonly called the "butt". With the aid of a machine or machines, such as that shown, it can be performed very rapidly and economically, and it has the important advantage of getting rid of the sapwood which, in a cedar pole, is more of a liability than an asset at points above the ground. In addition, this operation also removes most of the natural surface irregularities of the pole, gives the pole a much straighter and more pleasing appearance, and produces a finished surface which is desirable.

The only wood now left on the pole above the butt is the heartwood which naturally has an extremely high resistance to decay. The entire pole in this condition next is subjected to a pressure impregnating treatment with some suitable preservative such as creosote oil, or, more preferably, with a mixture of creosote oil and Montan wax in accordance with my prior Patent No. 1,556,570. It is preferable to use some water resistant impregnating medium, or, better yet, some agent which is practically waterproof, so that the preservative will not be washed out of the pole due to the action of the weather. Preferably, also, the butt portion of the pole which still contains its sapwood is perforated or incised, at least throughout the ground line area, preparatory to impregnating it, the perforations or incisions being indicated in Fig. 3 at 8. It usually is desirable, also, to complete the "framing" operations on the pole before it is impregnated, these operations including the cutting of the gains, the shaping of the top or "roof", and the boring of the holes for the bolts, steps, and lag screws.

The particular impregnating medium used, the kind of treatment, the pressures employed, and the other steps of this operation necessarily will depend upon the dimensions and conditions of the poles, the use to be made of them, and other practical considerations well understood by those skilled in the art of wood impregnation. Treatments such as those disclosed in my prior patent above designated are particularly suited to the requirements of these poles, but other treatments, such as those given generally by commercial treating plants, may also be used with satisfaction. The nature of cedar is such that the impregnating medium will not be forced into the heartwood for any great depth even though pressures between one hundred and two hundred pounds per square inch are used during the treatment. Such pressures will force creosote oil, or mixtures of Montan wax and creosote, longitudinally into the top and bottom end surfaces of the wood for a considerable distance, and the entire body of sapwood in the butt will be impregnated if the incising or perforating operations are properly performed. The impregnating medium also will be forced into the pores and cells of the outer layers of heartwood for a short distance, say for example, one-sixteenth of an inch, very little impregnation of the tracheids being produced in this manner, however, although the tracheids of the sapwood should be completely filled. The stippled sections in Figs. 3 and 4 indicate very roughly the depth of impregnation which may be expected, this depth being somewhat exaggerated in the upper part of Fig. 3 and in Fig. 4. The outside dotted lines in these figures, and also in Fig. 1, indicate the original relative dimensions of the pole before the operation of removing the sapwood has been performed.

This process produces a cedar pole much better adapted to compete successfully with those of other species than any heretofore obtainable, so far as I have been able to learn. Approximately all of the sapwood on the pole above ground has been removed leaving simply the harder, highly resistant heartwood which is exceptionally satisfactory for pole purposes. The entire butt, including the sapwood, is impregnated with preservative to a better degree than usual in the case of cedar poles. All of the wood of the butt is utilized. The remainder of the pole which is to be exposed above ground is given an unusually pleasing appearance, and the natural resistance of this wood to decay is increased by the pressure impregnation to which the entire pole has been subjected. This not only "paints" the pole but it drives the preservative into the outer strata of the wood to a greater depth than has been possible by prior methods. The use of an excessive quantity of preservative has, however, been avoided by the removal of the sapwood from the upper part of the pole, thus saving materially the expense of treatment. A better cedar pole thus is produced at a price comparing favorably with the cost of production by former methods. A further advantage of a pole prepared in this manner is that the amount of creosote contained in the pole above the butt is so small that the surface of the pole remains substantially dry and does not "bleed" even when impregnated simply with creosote oil.

The oozing of creosote from the portions of a pole above the butt, and which is commonly termed "bleeding", is an exceedingly serious objection to the use of pine poles impregnated in this manner in a great many localities, but this difficulty is completely avoided by the present process even when the impregnating medium used consists of creosote oil. If a mixture of Montan wax and creosote is used in accordance with my patent above designated, the "bleeding" difficulty also is avoided.

It should be understood that the term "butt" commonly is used to designate the portion of the pole which is set into the ground, plus an additional distance of from eighteen inches to two feet which commonly is treated or impregnated in order to provide a tolerance for variations in setting. The depth to which the poles are set will vary somewhat with the length of the pole and the character of the ground, a common depth for a thirty-five foot pole being six feet. Consequently, the butt of a pole of this length usually means the lower seven and one-half or eight feet of the pole. It is this portion only of cedar poles which has been treated or impregnated heretofore, the impregnating operation being performed by standing the poles upright in an open tank so as to immerse these butt portions of the poles, and saturate the sapwood in these parts of the poles so far as possible with the impregnating medium, no pressure other than atmospheric pressure, however, being used. It has never been considered practical, so far as I am aware, to pressure treat cedar poles.

A further advantage produced by this invention is the fact that it greatly reduces the checking or longitudinal splitting of the poles which has been an exceedingly serious practical objection to cedar poles as heretofore used. This has always been a troublesome factor in poles of this species even when untreated, and prior attempts to impregnate such poles for their full length have accentuated this tendency. In fact, this has been one of the most discouraging factors in prior experiments with the full length treating of cedar poles. The removal of the sapwood, however, prior to impregnation has had the extremely important and very surprising result of reducing the checking of the poles to such a degree that it is no longer a serious factor.

It should also be understood that in cedar there are a few rings at the inner margin of the sapwood which are often included in the sapwood because they have substantially the same color as the sapwood but which are really in the transition period between heartwood and sapwood. They resemble the heartwood more closely, however, so far as treating characteristics are concerned because it is extremely difficult to impregnate them. This transition wood may or may not be removed, as desired, but it is preferable to remove most of the true sapwood above the butt and which may be termed the "treatable portion" of the sapwood in order to distinguish it from the transition wood.

Having thus described my invention, what I desire to claim as new is:

1. That improvement in methods of preparing cedar poles for use, which consists in removing at least the greater part of the treatable portion of the sapwood above the butt, subsequently subjecting the entire pole including the butt with the sapwood thereon to a pressure impregnating treatment with a preservative, and, during said treatment, forcing said preservative through substantially the entire volume of the sapwood on the pole butt.

2. That improvement in methods of preparing cedar poles for use, which consists in removing at least the greater part of the treatable portion of the sapwood from the portion of the pole above the butt, perforating the sapwood of the butt portion of the pole, and then impregnating the entire length of the pole with a preservative by forcing said preservative into the pores and tracheids of the sapwood under relatively high pressure.

3. That improvement in methods of preparing cedar poles for use, which consists in removing at least the greater part of the treatable portion of the sapwood from the portion of the pole above the butt, at the same time smoothing up the surface irregularities of the section of the pole from which the sapwood is removed, and subsequently subjecting the entire pole to an impregnating treatment with a water resistant preservative during which the preservative is forced into the pores and tracheids of the sapwood under relatively high pressure.

JOSEPH R. COOLIDGE.